(12) United States Patent
Yoshiie et al.

(10) Patent No.: US 10,499,198 B2
(45) Date of Patent: *Dec. 3, 2019

(54) POSITIONING DEVICE AND POSITIONING SYSTEM

(71) Applicant: TOSHIBA TEC KABUSHIKI KAISHA, Tokyo (JP)

(72) Inventors: Yu Yoshiie, Mishima Shizuoka (JP); Mika Hirama, Kokubunji Tokyo (JP); Akihiko Fujiwara, Kawasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,192

(22) Filed: Mar. 11, 2019

(65) Prior Publication Data

US 2019/0208367 A1 Jul. 4, 2019

Related U.S. Application Data

(63) Continuation of application No. 15/927,138, filed on Mar. 21, 2018, now Pat. No. 10,257,659.

(30) Foreign Application Priority Data

Jul. 10, 2017 (JP) ................................ 2017-134784

(51) Int. Cl.
*H04W 4/029* (2018.01)
*G01C 21/16* (2006.01)
(Continued)

(52) U.S. Cl.
CPC .......... *H04W 4/029* (2018.02); *G01C 21/165* (2013.01); *G01C 21/206* (2013.01); *G01S 5/02* (2013.01);
(Continued)

(58) Field of Classification Search
CPC ..... H04W 4/023; H04W 4/043; H04W 4/027; H04W 72/085; H04W 4/02; H04W 8/14; H04W 92/08
See application file for complete search history.

(56) References Cited

U.S. PATENT DOCUMENTS 8,554,504 B2 10/2013 Sambongi
9,820,092 B1 11/2017 Fujiwara et al.
(Continued)

FOREIGN PATENT DOCUMENTS

JP         5206764 B2    6/2013

OTHER PUBLICATIONS

Extended European Search Report dated Dec. 10, 2018, dated in counterpart European Application No. 1818463.3, 8 pages.

*Primary Examiner* — Dung Hong
(74) *Attorney, Agent, or Firm* — Kim & Stewart LLP

(57) ABSTRACT

A positioning device includes a processor configured to calculate a first neighboring time at which the mobile device becomes closest to a first base station in the plurality of base stations based on the received signal strength data and a second neighboring time at which the mobile device becomes closest to a second base station of the plurality of base stations, and convert the relative movement data in the second storage device into position coordinates data specifying an absolute position of the mobile device in an absolute coordinate system using the first base station as a reference point from the first neighboring time to the second neighboring time.

20 Claims, 9 Drawing Sheets

(51) Int. Cl.
  *G01S 13/58* (2006.01)
  *G01S 5/14* (2006.01)
  *G01C 21/20* (2006.01)
  *G01S 5/02* (2010.01)

(52) U.S. Cl.
  CPC .............. *G01S 5/0294* (2013.01); *G01S 5/14* (2013.01); *G01S 13/58* (2013.01)

(56) References Cited

U.S. PATENT DOCUMENTS

| | | | |
|---|---|---|---|
| 10,257,659 B2 * | 4/2019 | Yoshiie | H04W 4/029 |
| 2003/0128690 A1 * | 7/2003 | Elliott | H04W 8/005 370/351 |
| 2005/0228613 A1 * | 10/2005 | Fullerton | G01S 5/0289 342/458 |
| 2006/0061469 A1 * | 3/2006 | Jaeger | B60R 25/00 340/539.13 |
| 2007/0217379 A1 * | 9/2007 | Fujiwara | G01S 5/0205 370/338 |
| 2008/0147461 A1 | 6/2008 | Lee et al. | |
| 2010/0099353 A1 * | 4/2010 | Komori | G08G 1/096716 455/39 |
| 2015/0119086 A1 | 4/2015 | Mirowski et al. | |

* cited by examiner

FIG. 2

| TIME | FIRST PLACE | | SECOND PLACE | | THIRD PLACE | |
|---|---|---|---|---|---|---|
| | ID | RSSI | ID | RSSI | ID | RSSI |
| 10:10:10 | 435 | -80 | 436 | -95 | 437 | -96 |
| 10:10:11 | 435 | -83 | 436 | -92 | 437 | -96 |
| 10:10:12 | 435 | -86 | 436 | -93 | 437 | -96 |
| 10:10:13 | 435 | -87 | 436 | -94 | 437 | -96 |
| 10:10:14 | 435 | -89 | 436 | -97 | 437 | -96 |
| 10:10:15 | 436 | -89 | 435 | -95 | 437 | -96 |
| 10:10:16 | 436 | -86 | 435 | -92 | 437 | -96 |
| 10:10:17 | 436 | -79 | 435 | -93 | 437 | -96 |
| 10:10:18 | 436 | -83 | 435 | -94 | 437 | -96 |
| 10:10:19 | 436 | -82 | 435 | -97 | 437 | -96 |
| 10:10:20 | 437 | -89 | 436 | -95 | 435 | -96 |
| 10:10:21 | 437 | -86 | 436 | -92 | 435 | -96 |
| 10:10:22 | 437 | -78 | 436 | -93 | 435 | -96 |
| 10:10:23 | 437 | -83 | 436 | -94 | 435 | -96 |
| 10:10:24 | 437 | -89 | 436 | -90 | 435 | -96 |

FIG. 3

| TIME | PDRx | PDRy | ANGLE (°) | MOVING AMOUNT (m) |
|---|---|---|---|---|
| 10:10:10 | PDRx1 | PDRy1 | 10 | 1.5 |
| 10:10:11 | PDRx2 | PDRy2 | -10 | 1.0 |
| 10:10:12 | PDRx3 | PDRy3 | -20 | 1.2 |
| 10:10:13 | PDRx4 | PDRy4 | -10 | 1.0 |
| 10:10:14 | PDRx5 | PDRy5 | 10 | 1.0 |
| 10:10:15 | PDRx6 | PDRy6 | 30 | 1.5 |
| 10:10:16 | PDRx7 | PDRy7 | -20 | 1.2 |
| 10:10:17 | PDRx8 | PDRy8 | 40 | 1.0 |
| 10:10:18 | PDRx9 | PDRy9 | 50 | 1.0 |
| 10:10:19 | PDRx10 | PDRy10 | 10 | 1.2 |
| 10:10:20 | PDRx10 | PDRy11 | -10 | 1.0 |
| 10:10:21 | PDRx12 | PDRy12 | -20 | 1.0 |
| 10:10:22 | PDRx13 | PDRy13 | -10 | 1.5 |
| 10:10:23 | PDRx14 | PDRy14 | -60 | 1.0 |
| 10:10:24 | PDRx15 | PDRy15 | 20 | 1.0 |

| TIME | FIRST ID | RSSI | OCCUPATION RATIO | SECOND ID | TOTAL ANGLE SUM (°) | MOVING AMOUNT (m) |
|---|---|---|---|---|---|---|
| 10:10:10 | 435 | −80 | 435:0.2 | 0 | 10 | 1.5 |
| 10:10:11 | 435 | −83 | 435:0.4 | | 0 | 1.0 |
| 10:10:12 | 435 | −86 | 435:0.6 | | −20 | 1.2 |
| 10:10:13 | 435 | −87 | 435:0.8 | 435 | −30 | 1.0 |
| 10:10:14 | 435 | −89 | 435:1.0 | 435 | −20 | 1.0 |
| 10:10:15 | 436 | −89 | 435:0.8 436:0.2 | 435 | 10 | 1.5 |
| 10:10:16 | 436 | −86 | 435:0.6 436:0.4 | | −10 | 1.2 |
| 10:10:17 | 436 | −79 | 435:0.4 436:0.6 | | 30 | 1.0 |
| 10:10:18 | 436 | −83 | 435:0.2 436:0.8 | 436 | 80 | 1.0 |
| 10:10:19 | 436 | −82 | 436:1.0 | 436 | 90 | 1.2 |
| 10:10:20 | 437 | −89 | 436:0.8 437:0.2 | 436 | 80 | 1.0 |
| 10:10:21 | 437 | −86 | 436:0.6 437:0.4 | | 60 | 1.0 |
| 10:10:22 | 437 | −78 | 436:0.4 437:0.6 | | 50 | 1.5 |
| 10:10:23 | 437 | −83 | 436:0.2 437:0.8 | 437 | −10 | 1.0 |
| 10:10:24 | 437 | −89 | 437:1.0 | 437 | 10 | 1.0 |

FIG. 5

| TIME | X | Y |
|---|---|---|
| 10:10:10 | X10 | Y10 |
| 10:10:11 | | |
| 10:10:12 | | |
| 10:10:13 | | |
| 10:10:14 | | |
| 10:10:15 | | |
| 10:10:16 | | |
| 10:10:17 | X20 | Y20 |
| 10:10:18 | | |
| 10:10:19 | | |
| 10:10:20 | | |
| 10:10:21 | | |
| 10:10:22 | X30 | Y30 |
| 10:10:23 | | |
| 10:10:24 | | |

334

POSITIONING DEVICE AND POSITIONING SYSTEM

CROSS-REFERENCE TO RELATED APPLICATIONS

This application is a continuation of U.S. patent application Ser. No. 15/927,138, filed on Mar. 21, 2018, which is based upon and claims the benefit of priority from Japanese Patent Application No. 2017-134784, filed Jul. 10, 2017, the entire contents of each of which are incorporated herein by reference.

FIELD

Embodiments described herein relate generally to a positioning device and a positioning system.

BACKGROUND

In an autonomous pedestrian navigation system that uses a pedestrian dead reckoning (PDR) technique, in which a position of a person or other object is detected and then a trajectory of the person or object is monitored or tracked based on detected changes in position. In the PDR technique, a moving direction and a moving distance can be detected by an acceleration sensor, a gyro sensor (also referred to as an angular velocity sensor), or a geomagnetic sensor (also referred to as an electronic compass).

In the PDR technique, a position of the person or object is measured relative to an arbitrary base point. That is, the position is represented according to a relative coordinate system. Therefore, for example, when the trajectory of person or object is to be displayed on a map using an absolute coordinate system, it is necessary to convert positions in the relative coordinate system (also referred to as relative coordinates) into coordinates in an absolute coordinate system (also referred to as absolute coordinates) for representation on the map.

In general, a person or an object carries a mobile station such as a mobile phone or mobile computer that can be connected to a mobile network. In communicating with the mobile network, the mobile station receives radio waves transmitted from a fixed-location transmission station. When the radio waves are received at the mobile station, the absolute coordinates of the transmission station can be used in determining the current position of the mobile station carried by the person or object. For example, the positioning device obtains a position in the absolute coordinate system, that is, a so-called absolute position, from a position measurement result obtained by a PDR technique that uses the coordinates of the fixed-location transmission station as a base point.

However, there may be inaccuracies in determining coordinates representing the current position of the mobile station in this manner. When a distance that radio waves travel from the transmission station to the mobile station is long, there is a possibility that the coordinates of the mobile station specified in the radio waves from the transmission station may not correspond to an actual position of the mobile station at the time of receiving the radio waves. That is, an absolute position of the mobile station in the absolute coordinate system set at the transmission station specified in the received radio wave is deviated from an actual position of the mobile station, and such deviations become large as a distance between the mobile station and the transmission station becomes large. However, if the permissible distance between the mobile station and the transmission station is shortened or restricted, then there may be instances in which the mobile station cannot utilize radio waves from a fixed-location transmission station and thus the current coordinates of the mobile station cannot be specified at all times.

In the related art, there is a technique in which a predetermined operation is performed by the mobile station when the mobile station comes closest to the transmission station, and the absolute coordinates are set according to signals received from the fixed transmission station after the predetermined operation is completed. Also, there is a technique in which a threshold value of the received signal strength from the transmission station is set in advance within the mobile station and the absolute coordinates from the fixed transmission station are set according to when the received signal strength exceeds the threshold value. However, the first technique is cumbersome because, in general, a non-autonomous operation by a person is required and thus use is restricted because human intervention is required. In the second technique, the received signal strength from the fixed transmission station may exceed the threshold value at an unexpected place distant from the fixed transmission station and in such a case, accuracy of positioning will be decreased.

DESCRIPTION OF THE DRAWINGS

FIG. 2 depicts an example of data stored in a first table of FIG. 1.

FIG. 3 depicts an example of data stored in a second table of FIG. 1.

FIG. 4 depicts an example of data stored in a third table of FIG. 1.

FIG. 5 depicts an example of data stored in a fourth table of FIG. 1.

DETAILED DESCRIPTION

In general, according to one embodiment, a positioning device includes a first storage device having stored therein received signal strength data in time series according to mobile device data, the mobile device data including current time information and a received signal strength indicator according to a signal strength between a mobile device and each of a plurality of base stations, a second storage device having stored therein relative movement data of the mobile device in time series within a relative coordinate system, and a processor configured to calculate a first neighboring time at which the mobile device becomes closest to a first base station in the plurality of base stations based on the received signal strength data in the first table, and then, a second neighboring time when the mobile device becomes closest to a second base station of the plurality of base stations, and convert the relative movement data in the second table into position coordinates data specifying an absolute position of the mobile device in an absolute coordinate system having the first base station as a base point from the first neighboring time until the second neighboring time.

In the example embodiments described below, a positioning device can detect an absolute position of a positioning target with high reliability without requiring a user's operation.

Figure 1:
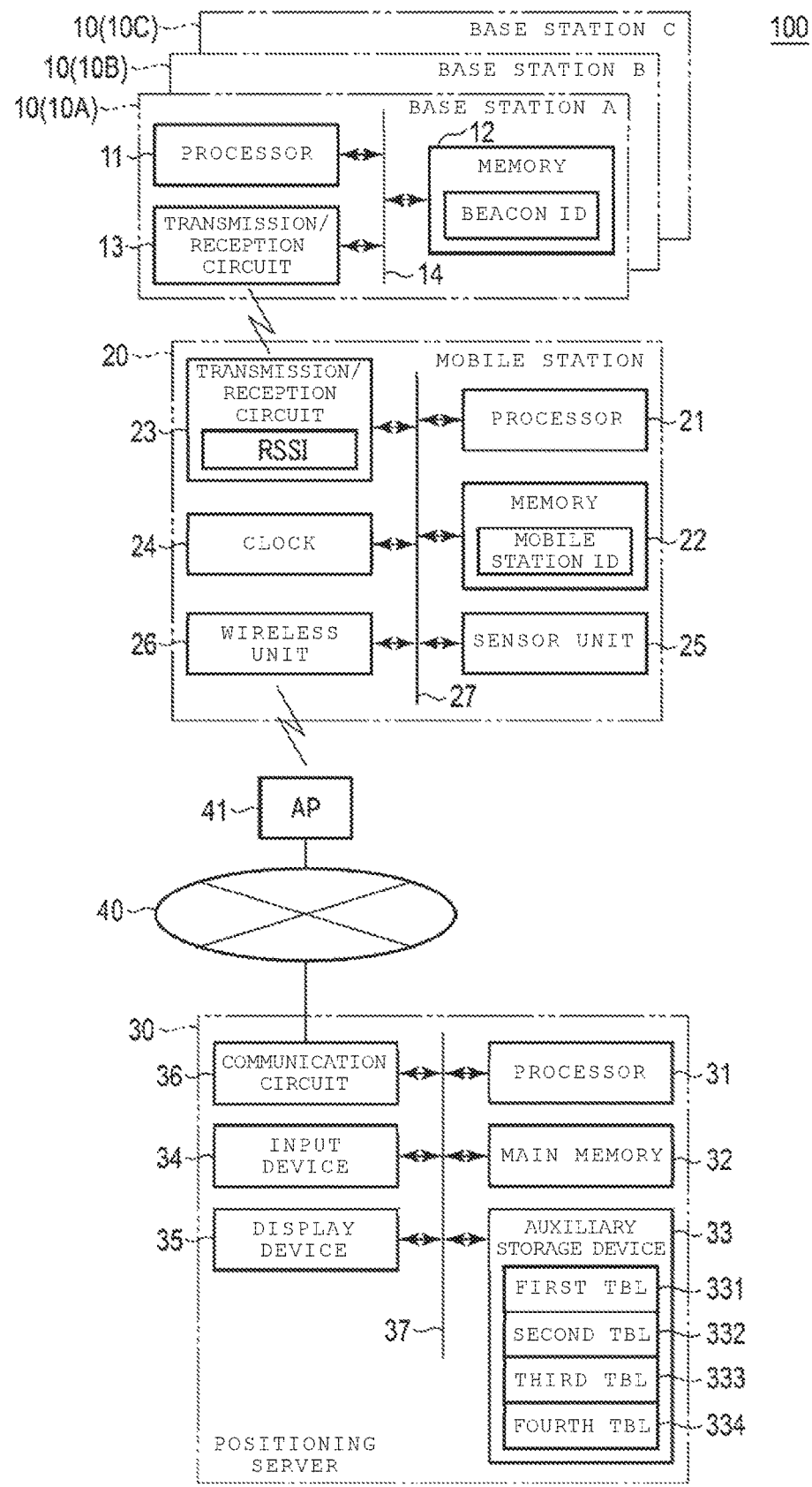
FIG. 1 is an overall configuration diagram of a positioning system according to an embodiment.

FIG. 1 is an overall configuration diagram of a positioning system 100 according to an embodiment. The positioning system 100 tracks a position of a positioning target, such as a person or an object, that moves within a predetermined positioning area or zone, for example, inside a building, such as a factory, a warehouse, or an office, or within a site in which a building or a facility is provided. The positioning system 100 includes multiple base stations (also referred to as transmission stations) 10 (individually labeled as 10A, 10B, and 10C in FIG. 1), a mobile station 20, and a positioning server 30 (also referred to as a positioning device).

The base stations 10 are fixed-location stations that are spaced apart from each other so as to be distributed within the positioning area. As such, each base station 10 is at a fixed location and thus the absolute coordinates of each base station are known. The number of the base stations 10 is not particularly limited to three. In consideration of circumstances of the positioning area, such as presence or absence of an obstacle, or the like, an appropriate number of the base stations 10 can be disposed at various positions within the positioning area.

The base station 10 functions as a transmitting device of a beacon signal. That is, each base station 10 transmits a predetermined unique beacon signal. Typically, the base station 10 is a beacon terminal that repeatedly transmits a Bluetooth® beacon signal according to the Bluetooth low energy (BLE) standard. The base station 10 may also transmit a beacon signal other than a Bluetooth® beacon signal. The beacon signal includes a beacon ID as identification information for specifying each base station 10. The beacon ID is unique information in which a different value is set for each base station 10.

A base station 10 includes at least a processor 11, a memory 12, and a transmission/reception circuit 13, and these components are connected to each other by a system transmission path 14 such as an address bus or a data bus. The base station 10 can be a computer having the processor 11 and the memory 12 connected by the system transmission path 14.

The processor 11 corresponds to a central processing unit of the computer. The processor 11 may control various sub-components to realize the various functions of the base station 10 according to an operating system and an application program executed thereon.

The memory 12 corresponds to a storage portion of the computer. The memory 12 includes a nonvolatile memory area and a volatile memory area. The memory 12 stores the operating system and the application program in the nonvolatile memory area. The memory 12 stores data necessary for the processor 11 functions in the nonvolatile memory area or the volatile memory area. The memory 12 uses the volatile memory area as a work area where data may be rewritten by the processor 11. The memory 12 uses the nonvolatile memory area as a storage portion for the beacon ID.

The transmission/reception circuit 13 wirelessly transmits a beacon signal including the beacon ID, according to a short-range wireless communication standard such as the BLE.

The mobile station 20 is a wireless communication terminal that can be carried by a positioning target, such as a person or other object, and moves together with the positioning target. The mobile station 20 functions as a receiving device for the beacon signal. That is, when the mobile station 20 exists within a radio wave arrival area of the beacon signal transmitted from the base station 10, the mobile station 20 can receive the beacon signal. When the beacon signal is received, the mobile station 20 detects the beacon ID in the beacon signal. Further, the mobile station 20 measures reception strength of the beacon signal, referred to as a received signal strength indication (RSSI). The mobile station 20 generates beacon data in which the beacon ID and the RSSI value are paired.

When the mobile station 20 is within transmission range of a plurality of base stations 10, the mobile station 20 receives the beacon signals transmitted from each of the base stations 10, respectively, and generates beacon data for each received beacon signal.

The mobile station 20 can measure a movement of the positioning target using the PDR technique. That is, the mobile station 20 includes an acceleration sensor, a gyro sensor, a geomagnetic sensor, or the like, and measures a direction including an angle and a distance of the movement of the positioning target, that is, a moving direction and a moving distance in real time, based on information from the sensors. The mobile station 20 obtains two-dimensional coordinates representing the position of the positioning target, referred to as relative coordinates (PDRx, PDRy) over time. The relative coordinates are represented in the relative coordinate system having a position of the positioning target at a start time is set as a base point (0,0), and coordinate changes are derived based on time-integrated data of the moving direction and the moving distance of the positioning target. Each time when the relative coordinates (PDRx, PDRy) of the positioning target are obtained, the mobile station 20 generates data (hereinafter, referred to as "relative movement data") in the relative coordinate system relating the movement of the positioning target. The relative movement data includes the current relative coordinates (PDRx, PDRy) and a moving direction and a moving distance from the previous relative coordinates obtained one time unit ago.

The mobile station 20 includes at least a processor 21, a memory 22, a transmission/reception circuit 23, a clock 24, a sensor unit 25, and a wireless unit 26. These components are connected to each other by a system transmission line 27 such as an address bus or a data bus. The mobile station 20 is a computer having the processor 21 and the memory 22 connected to each other by the system transmission line 27.

The processor 21 corresponds to a central processing unit of a computer. The processor 21 controls each unit to realize various functions of the mobile station 20, according to an operating system and an application program.

The memory 22 corresponds to a storing portion of the computer. The memory 22 includes a nonvolatile memory area and a volatile memory area. The memory 22 stores the operating system and the application program in the nonvolatile memory area. The memory 22 stores data necessary for the processor 21 to control each unit in the nonvolatile memory area or the volatile memory area. The memory 22 uses the volatile memory area as a work area where data is appropriately rewritten by the processor 21. The memory 22 uses the nonvolatile memory area as a storing portion of a mobile station ID. The mobile station ID is unique information in which a different value is set for each mobile station 20. The mobile station ID functions as identification information of the mobile station 20.

The transmission/reception circuit 23 receives a beacon signal transmitted from a base station 10 according to a short-range wireless communication standard such as the BLE. The transmission/reception circuit 23 includes a circuit for measuring the RSSI, which is the reception strength of the beacon signal.

The clock 24 provides the current date and time.

The sensor unit 25 includes an acceleration sensor, a gyro sensor, a geomagnetic sensor, or the like, which are sensors for the PDR. The acceleration sensor measures acceleration of the mobile station 20. The gyro sensor measures rotational angular velocity of the mobile station 20. The geomagnetic sensor measures a direction of a terrestrial magnetic field around the mobile station 20 and measures the azimuth of the mobile station 20 relative to, for example, magnetic North.

The wireless unit 26 performs wireless communication with an access point 41 on a network 40 according to the local area network (LAN) standard such as IEEE 802.15, IEEE 802.11, or IEEE 802.3. Specifically, the wireless unit 26 wirelessly transmits mobile station data to the positioning server 30 every one second in accordance with the clock 24, for example. The mobile station data includes the mobile station ID, the time measured by the clock 24, beacon data at the measured time, and relative movement data at the measured time.

As the mobile station 20 having such a configuration, a portable information terminal such as a smart phone, a mobile phone, a tablet terminal, or a notebook computer can be typically used.

The access point 41 is disposed at an appropriate position in the positioning area so that mobile station data transmitted from the mobile station 20 can be received from any location in the positioning area. The network 40 transmits mobile station data received by the access point 41 to the positioning server 30. The network 40 is, for example, a wireless network conforming to the WiFi® standard or a mobile communication network.

The positioning server 30 performs position measurement of the mobile station 20 specified by the mobile station ID included in the mobile station data, based on the mobile station data received through the network 40. In other words, the positioning server 30 performs position measurement of the positioning target which carries the mobile station 20 specified by the mobile station ID.

The positioning server 30 includes at least a processor 31, a main memory 32, an auxiliary storage device 33, an input device 34, a display device 35, and a communication circuit 36. These components are connected to each other by a system transmission line 37 such as an address bus or a data bus. The positioning server 30 is a computer having the processor 31, the main memory 32, and the auxiliary storage device 33 connected to each other by the system transmission line 37.

The processor 31 corresponds to a central unit of the computer. The processor 31 controls each unit to realize various functions as the positioning server 30, according to an operating system and an application program.

The main memory 32 corresponds to a storing portion of the computer. The main memory 32 includes a nonvolatile memory area and a volatile memory area. The main memory 32 stores the operating system and the application program in the nonvolatile memory area. The main memory 32 stores data necessary for the processor 31 to control each unit in the nonvolatile memory area or the volatile memory area. The main memory 32 uses the volatile memory area as a work area where data is appropriately rewritten by the processor 31.

The auxiliary storage device 33 corresponds to an auxiliary storing portion of the positioning server 30. For example, an electric erasable programmable read-only memory (EEPROM), a hard disc drive (HDD), a solid state drive (SSD), and the like are used as the auxiliary storage device 33. In the auxiliary storage device 33, a first table 331, a second table 332, a third table 333, and a fourth table 334 are formed. The first to fourth tables 331, 332, 333, and 334 are formed respectively for one positioning target. That is, when multiple positioning targets are present, the first to fourth tables 331, 332, 333, and 334 are formed for each positioning target.

The input device 34 and the display device 35 function as a user interface device that are responsible for information transmission between the positioning server 30 and a user of the server. The input device 34 is a touch panel, a mouse, a keyboard, or the like. The display device 35 is a liquid crystal display, an LED display, or the like.

The communication circuit 36 is connected to the network 40 and captures mobile station data received by the access point 41.

Next, the first to fourth tables 331, 332, 333, and 334 will be described with reference to FIGS. 2 to 5.

FIG. 2 depicts an example of data stored in the first table 331. As depicted in FIG. 2, in the first table 331, pieces of beacon data, in which beacon IDs and values of RSSI are paired with each other, are stored in order of stronger RSSI from first place to third place in association with the time.

Each time when mobile station data is received from one mobile station 20, the processor 31 acquires the time and beacon data included in the mobile station data. When a plurality of pieces of beacon data are included in the mobile station data, the processor 31 compares the RSSI values included in the pieces of beacon data. The processor 31 selects a beacon ID in descending order of the RSSI value and sets the beacon ID and the value of RSSI together with the time included in the same mobile station data in order from the first place in the first table 331. When there is only one beacon data, the only one beacon data, together with the time included in the same mobile station data, is set in the first table 331 as data of the first place. Here, the first table 331 functions as a first storing unit.

FIG. 3 depicts an example of data stored in the second table 332. As depicted in FIG. 3, the relative coordinates (PDRx, PDRy), a moving direction, and a moving distance are stored in the second table 332 in association with the time.

Each time when mobile station data is received from one mobile station 20, the processor 31 acquires the time and relative movement data included in the mobile station data. The processor 31 sets the relative coordinates (PDRx, PDRy), the moving direction, and the moving distance included in the relative movement data, together with the time included in the same mobile station data, respectively, in the second table 332. Here, the second table 332 functions as a second storing unit.

FIG. 4 depicts an example of data stored in the third table 333. As depicted in FIG. 4, data of a first ID, an RSSI, an occupation ratio, a second ID, a total angle sum, and a moving amount are stored in the third table 333 in association with the time. The first ID, the RSSI, the occupation ratio, the second ID, the total angle sum, and the moving amount will be described later.

FIG. 5 depicts an example of data stored in the fourth table 334. As depicted in FIG. 5, two-dimensional coordinates in the absolute coordinate system, referred to as absolute coordinates (X, Y) are stored in the fourth table 334 in association with the time. Specifically, in the fourth table 334, the absolute coordinates (X, Y) obtained after the relative coordinates (PDRx, PDRy) representing the position of the positioning target stored in FIG. 3 are converted into coordinates of the absolute coordinate system are stored.

Figure 6:
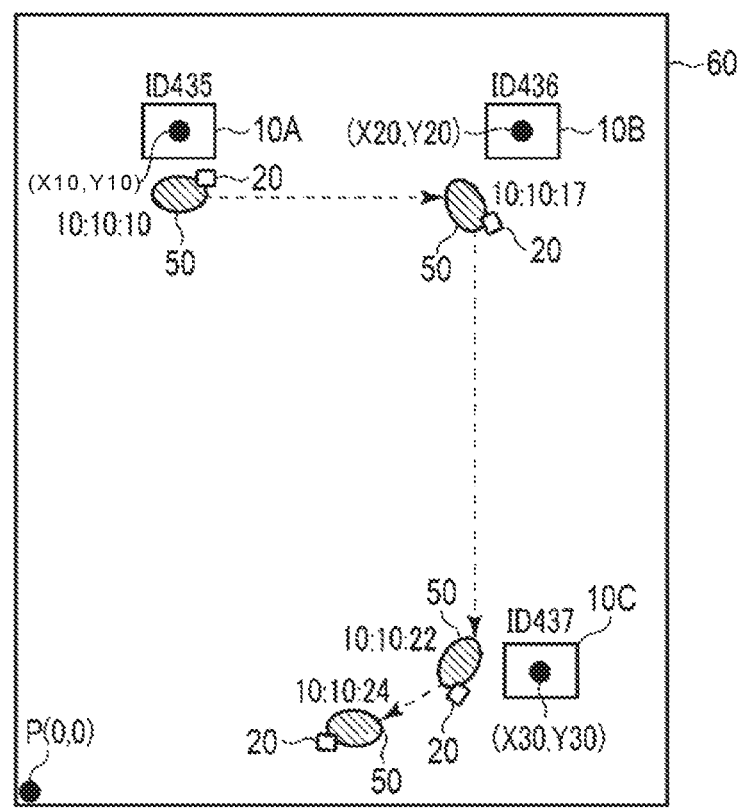
FIG. 6 is a schematic diagram of an example movement of a positioning target.

FIG. 6 is a schematic diagram of an example movement of a positioning target 50 carrying the mobile station 20 within a positioning area 60. The base station 10A for which a beacon ID "435" is set, the base station 10B for which a beacon ID "436" is set, and the base station 10C for which a beacon ID "437" is set are disposed in the positioning area 60. Specifically, the base station 10A is disposed at a position specified by the absolute coordinates (X10, Y10) of the absolute coordinate system in which the lower left of the positioning area 60 is set as the origin P(0, 0). Similarly, the base station 10B is disposed at a position specified by the absolute coordinates (X20, Y20) in the same absolute coordinate system, and the base station 10C is disposed at a position specified by the absolute coordinates (X30, Y30) in the same absolute coordinate system. In the auxiliary storage device 33 of the positioning server 30, position information indicating the absolute coordinates of the base stations 10A, 10B, and 10C are stored in advance in association with the beacon ID of each of the base stations 10A, 10B, and 10C. Map information of the positioning area 60 is also stored in the auxiliary storage device 33.

The origin P (0, 0) in the absolute coordinate system is not limited to the position shown in FIG. 5. For example, the upper left or center of the positioning area 60 may be set as the origin P (0, 0). Each of the base stations 10A, 10B, and 10C may be associated with identification information for identifying each of the base stations 10A, 10B, and 10C, for example, a base station ID without associating position information of each of the base stations 10A, 10B, and 10C with the beacon ID. In this case, a conversion table for storing the beacon ID and the base station ID in association with each other and converting the beacon ID into the base station ID is needed.

Hereinafter, an operation of the positioning system 100 will be described based on a movement example of FIG. 6.

In the movement example of FIG. 6, the positioning target 50 the mobile station 20 moves from the vicinity of the base station 10A at time "10:10:10", passes through the vicinity of the base station 10B at time "10:10:17", further passes through the vicinity of the base station 10C at time "10:10:22", and moves to a position depicted at time "10:10:24.". Data of the first table 331 and the second table 332 created by mobile station data wirelessly transmitted from the mobile station 20 as needed according to such movement is depicted in FIGS. 2 and 3.

At time "10:10:10", the mobile station 20 receives the beacon signal including the beacon ID "435" with the largest RSSI "−80 dbm", the beacon signal including the beacon ID "436" with the second largest RSSI "−95 dbm", and the beacon signal including the beacon ID "437" with the third largest RSSI "−96 dbm", as shown in the first table 331 of FIG. 2. Further, at the same time "10:10:10", the positioning target 50 carrying the mobile station 20 at a position of the relative coordinates (PDRx1, PDRy1) and moves 1.5 m in a direction of an angle of +10° and is present as shown in the second table of FIG. 3

At time "10:10:11", the mobile station 20 receives the beacon signal including the beacon ID "435" with the largest RSSI "−83 dbm", the beacon signal including the beacon ID "436" with the second largest RSSI "−92 dbm", and the beacon signal including the beacon ID "437" with the third largest RSSI "−96 dbm" as shown in the first table 331 of FIG. 2. Further, at the same time "10:10:11", the positioning target 50 carrying the mobile station 20 is present at a position of the relative coordinates (PDRx2, PDRy2) and moves 1 m from the position of the relative coordinates (PDRx1, PDRy1) in the direction of an angle of −10° as shown in the second table 332 of FIG. 3.

The positions and the movements of the positioning target 50 described above can be similarly applied to other times after the times "10:10:10" and "10:10:11". For example, at time "10:10:17", the mobile station 20 receives the beacon signal including the beacon ID "436" with the largest RSSI "−79 dbm", the beacon signal including the beacon ID "435" with the second largest RSSI "−93 dbm", and the beacon signal including the beacon ID "437" with the third largest RSSI "−96 dbm" as shown in the first table 331 of FIG. 2. At the same time "10:10:17", the positioning target 50 carrying the mobile station 20 is present at a position of the relative coordinates (PDRx8, PDRy8) and moves 1 m from a position of the relative coordinates (PDRx7, PDRy7) in the direction of an angle of +40° as shown in the second table 332 of FIG. 3.

Figure 7:
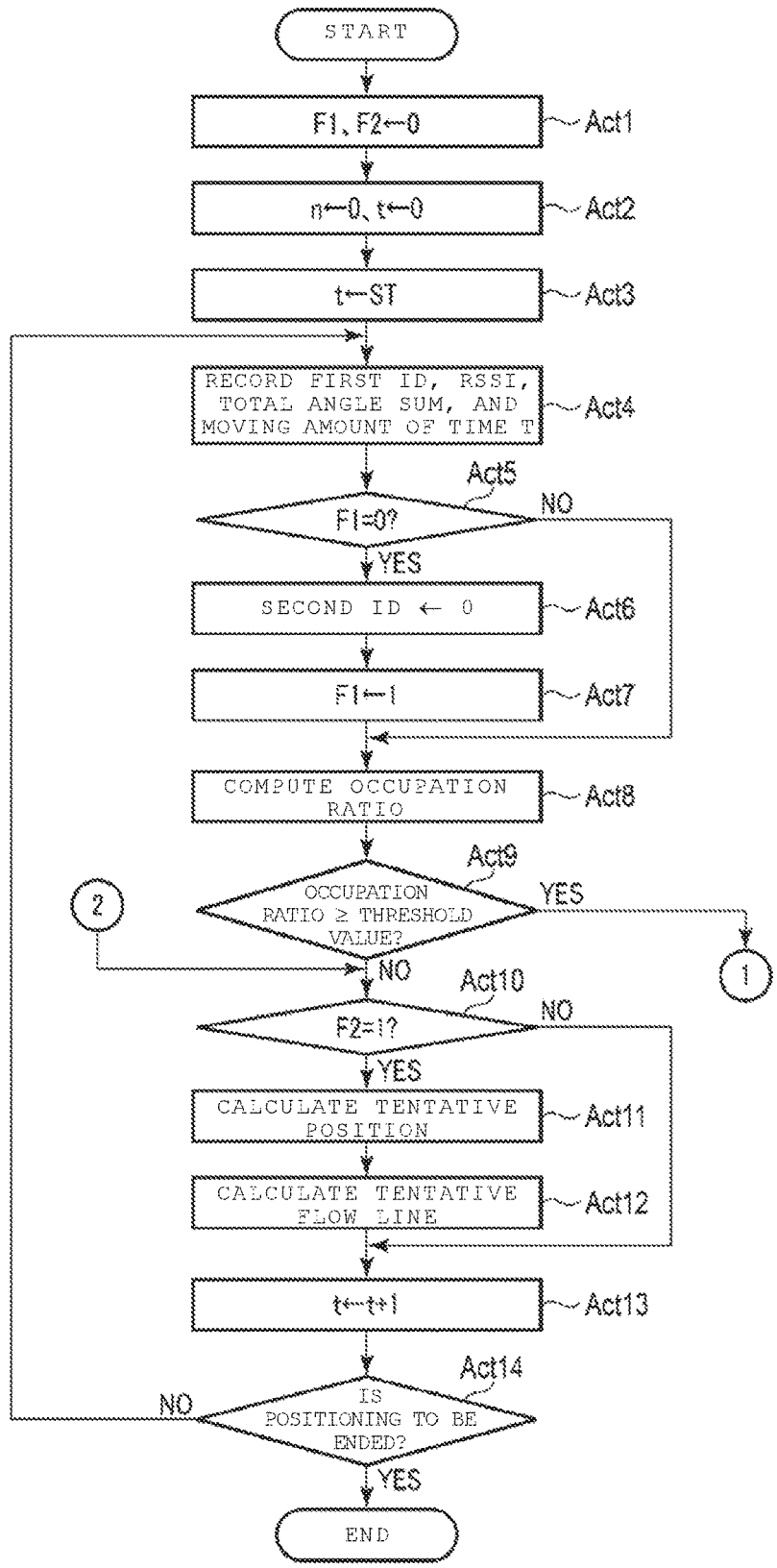
FIG. 7 is a flowchart of main information processing executed by a processor of a positioning server.
Figure 8:
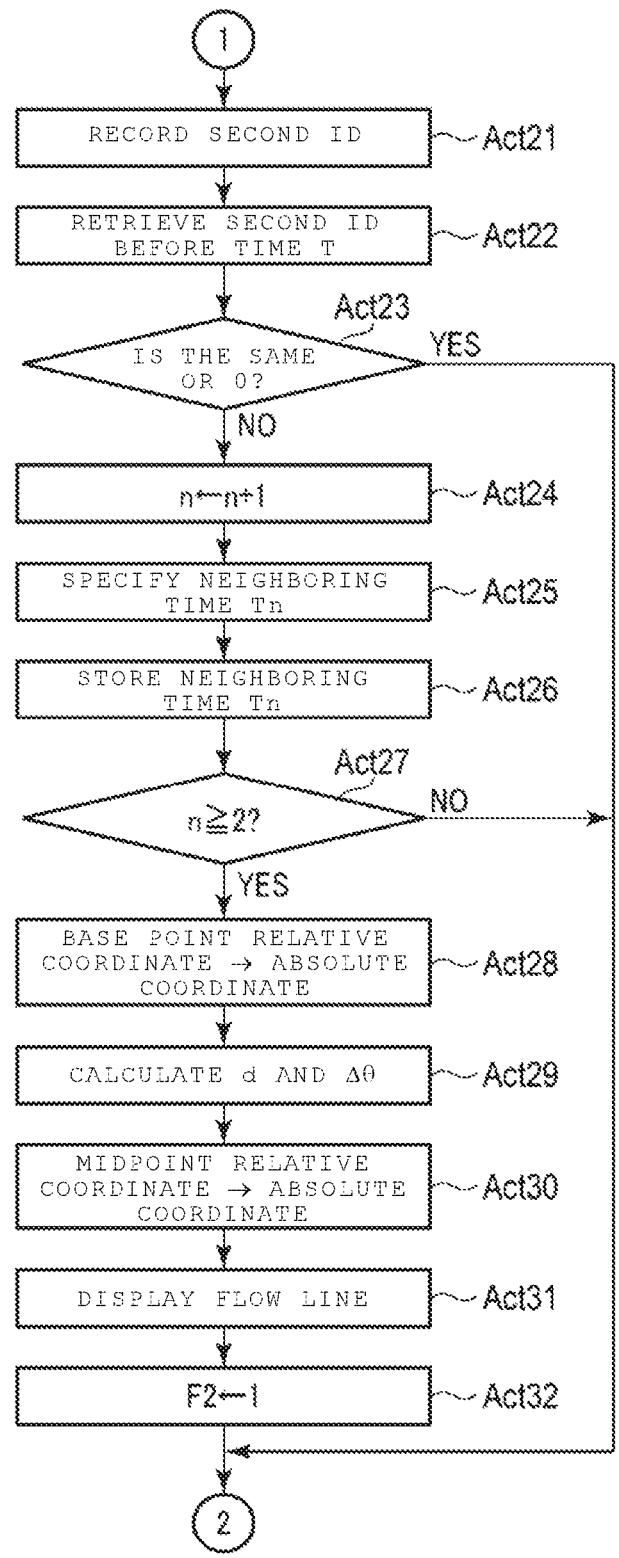
FIG. 8 is another flowchart of main information processing executed by a processor of a positioning server.

In a state where data depicted in FIGS. 2 and 3 are stored in the first table 331 and the second table 332, when an instruction to generate a trajectory of the positioning target is input through the input device 34, the processor 31 executes information processing according to a procedure depicted in flowcharts of FIG. 7 and FIG. 8. This information processing follows a trajectory generation program stored in the main memory 32 or the auxiliary storage device 33. It should be noted that the particular processing steps described below are some possible examples of information processing for generating a trajectory of a positioning target 50 and do not limit the possible processing steps or the like according to the present disclosure.

Initially, as Act 1, the processor 31 sets both a first flag F1 and a second flag F2 to "0". As Act 2, the processor 31 resets both a first counter n and a second counter t to "0". A processing order of Act 1 and Act 2 may be reversed.

The first flag F1 is 1-bit data which holds "0" until a first record is recorded in the third table 333 of FIG. 3 and the first flag F1 is updated to "1" when the first record is recorded. The second flag F2 is 1-bit data which holds "0" until the relative coordinates (PDRx, PDRy) stored in the second table 332 of FIG. 3 are converted into the absolute coordinates (X, Y) and the second flag F2 is updated to "1" after the conversion. The first counter n counts a number of times when the positioning target 50 comes closest to any of the base stations 10 (also referred to as a neighboring time). The second counter t record the time. The first flag F1, the second flag F2, the value of the first counter n, and the value of the second counter t are stored in the volatile memory area of the main memory 32.

As Act 3, the processor 31 acquires a start time ST. The processor 31 sets a value corresponding to the start time ST as an initial value of the second counter t. The start time ST is input through the input device 34. In this operation example, the start time ST is set to "10:10:10".

As Act 4, the processor 31 obtains the first ID, the RSSI, the total angle sum, and the moving amount at time T and records the obtained first ID, RSSI, total angle sum, and the moving amount in the third table 333. Time T is the time corresponding to a value of the second counter t. The first ID is a beacon ID included in the beacon signal whose the RSSI indicates the largest value at time T and the RSSI value of the beacon signal is set in an RSSI area of the third table 333. The first ID and the RSSI can be obtained from data at time T in the first table 331. The total angle sum is a value obtained by adding the angle of the positioning target 50 at time T to the total angle sum total of the record at time (T−1) in the third table 333. However, in a case where a record at time (T−1) does not exist in the third table 333, the angle of the positioning target 50 at time T is the total angle sum. The moving amount is a moving amount of the positioning target 50 at time T. The angle and the moving amount of the positioning target 50 at time T can be obtained from data at time T of the second table 332.

In a case where the time T is the start time "10:10:10", the record at time (T−1) does not exist in the third table 333. Accordingly, the processor 31 records "435" as the first ID, "−80" as the RSSI, "10" as the total angle sum, and "1.5" as the moving amount, respectively, in the third table 333 in association with the time "10:10:10".

As Act 5, the processor 31 determines whether the first flag F1 is "0" or not. When it is determined that the first flag F1 is "0", in Act 4, it is indicated that the first record is recorded in the third table 333. When it is determined that the first flag F1 is "0" (YES in Act 5), as Act 6, the processor 31 records a predetermined value "0" as a second ID of the first record. As Act 7, the processor 31 updates the first flag F1 with "1". Thereafter, the processor 31 proceeds to Act 8.

In a case where the time T is the start time "10:10:10", the first flag F1 is "0" at the time of Act 5. Accordingly, the processor 31 records "0" as the second ID in the record at time "10:10:10" of the third table 333. The value recorded as the second ID in the first record of the third table 333 is not limited to "0". In short, a value with which the processor 31 can identify the first record may be available.

In Act 5, in a case where the first flag F1 is already updated with "1" (NO in Act 5), the processor 31 skips processing of Act 6 and Act 7 and proceeds to Act 8. That is, in a case where the second and subsequent records are recorded in the third table 333 in Act 4, the processor 31 skips processing of Act 6 and Act 7 and proceeds to Act 8.

In Act 8, the processor 31 computes the occupation ratio. The occupation ratio is a ratio of the base station for which the RSSI becomes the largest within a time period retroacting from the current time T by a predetermined evaluation target time. In this operation example, the evaluation target time is set to 5 seconds. The beacon ID of the base station having the largest RSSI within the evaluation time period retroacting from the time T is recorded as the first ID in the third table 333 for each time within the time period. The processor 31 computes the occupation ratio from information of a first ID area of the third table 333.

In a case where the time T is the start time "10:10:10", a record before time "10:10:10" is not present in the first table 331. That is, as a first ID which becomes a computation target of the occupation ratio, only the beacon ID of "435" of the base station 10A is present. Accordingly, in a case where the evaluation target time is set to 5 seconds, the occupation ratio is 20% (⅕=0.2) of the base station 10A. The processor records "435:0.2" ("beacon ID:occupation ratio"), as occupation ratio information, in the record at time "10:10:10" of the third table 333.

As Act 9, the processor 31 determines whether the occupation ratio equal to or greater than a predetermined threshold value is calculated or not. In this operation example, the threshold value is set to 0.8 (80%). In a case where it is determined that the occupation ratio equal to or greater than the threshold value is not calculated (NO in Act 9), as Act 10, the processor 31 determines whether the second flag F2 is updated with "1" or not.

In a case where it is determined that the second flag F2 is updated with "1" (YES in Act 10), the processor 31 executes processing of Act 11 to Act 13. In a case where it is determined that the second flag F2 is not updated with "1" (YES in Act 10), the processor 31 skips processing of Act 11 and Act 12 and executes only processing of Act 13. Processing of Act 11 and Act 12 will be described later. In Act 13, the processor 31 counts up the second counter t by "1".

As described above, in a case where the time T is "10:10:10", the occupation ratio equal to or greater than the threshold value is not calculated. Also, the second flag F2 is "0". Accordingly, the processor 31 proceeds to Act 13 and counts up the second counter t by "1".

When processing of Act 13 is ended, as Act 14, the processor 31 determines whether or not an instruction to end positioning is input. The instruction to end the positioning is input through the input device 34. In a case where it is determined that the instruction to end the positioning is not input, the processor 31 returns to Act 4 and executes again processing in and after Act 4.

That is, the processor 31 records "435" as the first ID, "−83" as the RSSI, "0" as the total angle sum, and "1.0" as the moving amount, respectively, in the third table 333 in association with the time "10:10:11" which corresponds to the value of the second counter t. The processor 31 computes the occupation ratio. The first flag F1 is updated with "1" and thus, the processor 31 does not perform processing of Act 6 and Act 7.

In a case where the time T is "10:10:11", as the first ID which becomes the computation target of the occupation ratio, only two beacon IDs of "435" of the base station 10A are present. Accordingly, in a case where the evaluation target time is set to 5 seconds, the occupation ratio is 40% (⅖=0.4) of the base station 10A. The processor 31 records "435:0.4" as occupation ratio information in the record at time "10:10:11" in the third table 333. Also, in this case, the occupation ratio does not reach the threshold value and thus, the processor 31 proceeds to Act 13 and counts up the second counter t. Thereafter, in a case where the instruction to end positioning is not made, the processor 31 returns to Act 4 and executes processing in and after Act 4 again.

As a result, the processor 31 records "435" as the first ID, "−86" as the RSSI, "435:0.6" as the occupation ratio, "−20" as the total angle sum, and "1.2" as the moving amount, respectively, in the third table 333 in association with the time "10:10:12". The processor 31 records "435" as the first ID, "−87" as the RSSI, "435:0.8" as the occupation ratio, "−30" as the total angle sum, and "1.0" as the moving amount, respectively, in the third table 333 in association with the time "10:10:13".

Here, the occupation ratio calculated at "10:10:13" is equal to or greater than the threshold value. When it is determined that the occupation ratio is equal to or greater than the predetermined threshold value (YES in Act 9), the processor 31 proceeds to Act 21 of FIG. 8. That is, as Act 21, the processor 31 records the beacon ID "435" of the base station whose occupation ratio is equal to or greater than the threshold, as the second ID, in the record at time "10:10:13" of the third table 333.

When processing of Act 21 is ended, as Act 22, the processor 31 retrieves the second ID of the record, which is recorded in the third table 333 in association with the time before time T, retroactively from the time T. As Act 23, the processor 31 determines whether or not a second ID detected first is "0" or the same as the second ID recorded in the third table 333 in association with the time T. Here, in a case where it is determined that a second ID detected first is "0" or the same as the second ID recorded in the third table 333 in association with the time T (YES in Act 23), the processor 31 proceeds to Act 10 of FIG. 7.

In the present operation example, at time "10:10:13", the second ID detected first from the third table 333 is "0" associated with the time "10:10:10". Accordingly, the processor 31 proceeds to Act 10. At this point in time, the second flag F2 is set to "0". Accordingly, the processor 31 proceeds to Act 13 and counts up the second counter t. Thereafter, in a case where it is determined that the instruction to end positioning is not made, the processor 31 returns to Act 4 and executes processing in and after Act 4 again.

As a result, the processor 31 records "435" as the first ID, "−89" as the RSSI, "435:1.0" as the occupation ratio, "−20" as the total angle sum, and "1.0" as the moving amount, respectively, in the third table 333 in association with the time "10:10:14". The occupation ratio is equal to or greater than the threshold value and thus, the processor 31 records "435" as the second ID.

In this case, the second ID detected first by retrieving the third table 333 is "435" recorded in association with the time "10:10:13" and coincides with the second ID "435" recorded in association with the time "10:10:14". Accordingly, the processor 31 proceeds to Act 10. Even at this point in time, the second flag F2 is set to "0". Accordingly, the processor 31 proceeds to Act 13 and counts up the second counter t. Thereafter, in a case where the instruction to end positioning is not made, the processor 31 returns to Act 4 and executes the processing in and after Act 4 again.

When the time T reaches "10:10:15", the beacon ID included in the beacon signal whose the RSSI indicates the largest value "−89" at that time T changes to "436" of the base station 10B. As a result, the processor 31 records "436" as the first ID, "−89" as the RSSI, "10" as the total angle sum, and "1.5" as the moving amount, respectively, in the third table 333 in association with the time "10:10:15". The first IDs which become the computation target for the occupation ratio are four beacon IDs of "435" of the base station 10A and one beacon ID of "436" of the base station 10B. Accordingly, the processor 31 records "435:0.8, 436:0.2" as the occupation ratio. Also, in this case, the occupation ratio of the base station 10A is equal to or greater than the threshold value and thus, the processor 31 records "435" as the second ID.

Similarly, the processor 31 records the first ID, the RSSI, the occupation ratio, total angle sum, and the moving amount in the third table 333 in association respectively with the time "10:10:16", "10:10:17", and "10:10:18". Also, at time "10:10:18", the occupation ratio of the beacon ID "436" is equal to or greater than the threshold value and thus, the processor 31 records "436" as the second ID. In this case, as a result of retrieving the third table 333 in Act 22, the second ID detected first is "435" recorded in association with the time "10:10:15" and thus, the second IDs are not coincident with each other. That is, the processor 31 determines that the determination result in Act 23 is "NO" and proceeds to Act 24. In Act 24, the processor 31 counts up the counter n by "1". That is, the value of counter n becomes "1".

As Act 25, the processor 31 specifies an n-th neighboring time Tn. The "n" is the value of counter n. Specifically, the processor 31 retrieves the records of the third table 333 retroactively from the time T and acquires the second ID detected first. The processor 31 extracts all the records, in which the same ID as the second ID is recorded as the first ID, from the third table 333 at the time before time T. The processor 31 sets the time of a record having the largest RSSI among the extracted records as the neighboring time Tn.

That is, the second ID detected first retroactively from time "10:10:18" is "435" at time "10:10:15". Accordingly, five records, in which the first ID "435" is recorded and which are associated with the time "10:10:10" to the time "10:10:14", are extracted from the third table 333. Among the five records, the largest RSSI is the RSSI "−80" of the record at time "10:10:10". Accordingly, the time "10:10:10" of the record having the largest RSSI becomes the first neighboring time T1.

When the neighboring time T1 is specified, as Act 26, the processor 31 stores the neighboring time T1 in the volatile memory area of the main memory 32. Next, as Act 27, the processor 31 determines whether the value of the counter n is equal to or greater than "2" or not. In a case where it is determined that the value of the counter n is less than "2" (NO in Act 27), the processor 31 proceeds to Act 10 of FIG. 7.

At time "10:10:18", the counter n is "1". Accordingly, the processor 31 proceeds to Act 10 of FIG. 7. Even at this point in time, the second flag F2 is set to "0". Accordingly, the processor 31 proceeds to Act 13 and counts up the second counter t. Thereafter, in a case where the instruction to end positioning is not made, the processor 31 returns to Act 4 and executes the processing in and after Act 4 again.

As a result, the processor 31 records "436" as the first ID, "−82" as the RSSI, "436:1.0" as the occupation ratio, "436" as the second ID, "90" as the total angle sum, and "1.2" as the moving amount, respectively, in the third table 333 in association with the time "10:10:19".

Thereafter, similarly, the processor 31 records the first ID, the RSSI, the occupation ratio, the total angle sum, and the moving amount in the third table 333 in association respectively with the time "10:10:20", "10:10:21", "10:10:22", and "10:10:23". Also, at time "10:10:20", the occupation ratio of the beacon ID "436" is equal to or greater than the threshold value and thus, the processor 31 records "436" as the second ID. Similarly, at time "10:10:23", the occupation ratio of the beacon ID of "437" equal to or greater than the threshold value and thus, the processor 31 records the second ID "437".

When the second ID "437" is recorded in association with the time "10:10:23", in Act 23, it is determined that the second IDs are not coincident with each other. As a result, the processor 31 proceeds to Act 24 and counts up the counter n by "1". That is, the value of the counter n becomes "2".

As Act 25, the processor 31 specifies second neighboring time T2. Specifically, the second ID detected first retroactively from time "10:10:23" is "436". Accordingly, five records, in which the first ID "436" is recorded and which are associated with the time "10:10:15" to the time "10:10:19", are extracted from the third table 333. Among the five records, the largest RSSI is the RSSI "−79" of the record at time "10:10:17". Accordingly, the time "10:10:17" of the record having the largest RSSI becomes the second neighboring time T2.

Here, the processor 31 realizes the determination unit by executing processing of Act 8, Act 9, and Act 21 to Act 26.

When the second neighboring time T2 is stored in the volatile memory area of the main memory 32 in Act 26, the processor 31 determines that the determination result in Act 27 is YES and proceeds to Act 28.

In Act 28, the processor 31 sets the relative coordinates (PDRx, PDRy) of the positioning target 50 at the neighboring time T(n−1), which corresponds to the first time one before the latest neighboring time Tn which is the second time, as the first base point of the relative coordinate system. The processor 31 replaces the relative coordinates (PDRx, PDRy), which are set as the first base points of the relative coordinate system, with the absolute coordinates (X, Y) of the base station 10 that transmits the strongest beacon signal at the neighboring time T(n−1). Similarly, the processor 31 sets the relative coordinates (PDRx, PDRy) of the positioning target 50 at the latest neighboring time Tn, which is the second time, as the second base point of the relative coordinate system. The processor 31 replaces the relative coordinates (PDRx, PDRy), which are set as the second base point of the relative coordinate system, with the absolute coordinates (X, Y) of the base station 10, which transmits the strongest beacon signal at the neighboring time Tn.

In the present operation example, the latest neighboring time (second time) T2 is "10:10:17" and the neighboring time (first time) T1 which corresponds to the time one before time "10:10:17" is "10:10:10". Accordingly, the relative coordinates (PDRx1, PDRy1) of the positioning target 50 when it is the time T1 ("10:10:10") become the first base point of the relative coordinate system. The relative coordinates (PDRx8, PDRy8) of the positioning target 50 when it is the time T2 ("10:10:17") become the second base point of the relative coordinate system. The base station that transmits the strongest beacon signal at time T1 ("10:10: 10") is the base station 10A and the absolute coordinates of the base station 10A are (X10, Y10). The base station that transmits the strongest beacon signal at time T2 ("10:10: 17") is the base station 10B and the absolute coordinates of the base station 10B are (X20, Y20).

Accordingly, in Act 28, the processor 31 records an absolute coordinates (X10, Y10) in association with the time T1 ("10:10:10") of the fourth table 334 so that the relative coordinates (PDRx1, PDRy1) when it is the time T1 ("10: 10:10"), relative coordinates of the first base point, is replaced with the absolute coordinates (X10, Y10). Similarly, the processor 31 records the absolute coordinates (X20, Y20) in association with the time T2 ("10:10:17") of the fourth table 334 so that the relative coordinates (PDRx8, PDRy8) at time T2 ("10:10:17"), relative coordinates of the second base point, is replaced with the absolute coordinates (X20, Y20).

When the processing of Act 28 is ended, as Act 29, the processor 31 calculates a scale magnification d and a rotational direction displacement Δθ for converting the relative coordinates into the absolute coordinates. That is, the processor 31 calculates the scaling magnification d by the following equation (1) and calculates the displacement Δθ in a rotational direction by the following equation (2), based on the relative coordinates (PDRx1, PDRy1) of the first base point, the relative coordinates (PDRx8, PDRy8) of the second base point, the absolute coordinates (X10, Y10) of the first base point, the absolute coordinate (X20, Y20) of the second base point. In the equation (1), contents within the brackets [ ] mean that the contents are contained in route symbols on the left side of the brackets.

$$d = \sqrt{[(X20-X10)^2 + (Y20-Y10)^2]} / \sqrt{[(PDRx8-PDRx1)^2 + (PDRy8-PDRy1)^2]} \quad (1)$$

$$\Delta\theta = \tan^{-1}[(Y20-Y10)/(X20-X10)] - \tan^{-1}[(PDRy8-PDRy1)/(PDRx8-PDRx1)] \quad (2)$$

Next, as Act 30, the processor 31 converts the position of the positioning target 50 in each time ("10:10:11" to "10: 10:16") within a time period from the time T1 ("10:10:10") to time T2 ("10:10:17"), a the relative coordinates (PDRx, PDRy) of the midpoints, into the absolute coordinates (X, Y), by the following equations (3) and (4) using the scaling magnification d and the rotational direction displacement Δθ.

$$X = d(PDRx \cos \Delta\theta - PDRy \sin \Delta\theta) \quad (3)$$

$$Y = d(PDRx \sin \Delta\theta + PDRy \cos \Delta\theta) \quad (4)$$

The processor 31 records the absolute coordinates (X, Y) obtained by being converted from the relative coordinates (PDRx, PDRy) of each time ("10:10:11" to "10:10:16") within the time period in association with the time ("10:10: 11" to "10:10:16") of the fourth table 334.

Here, the processor 31 realizes a conversion unit by executing processing of Act 28 to Act 30.

As the Act 31, the processor 31 causes the display device 35 to display a trajectory display screen 70 (see FIG. 9) representing the trajectory of the positioning target from time T1 to time T2, based on the absolute coordinates (X, Y) for each time stored in the fourth table 334.

Figure 9:
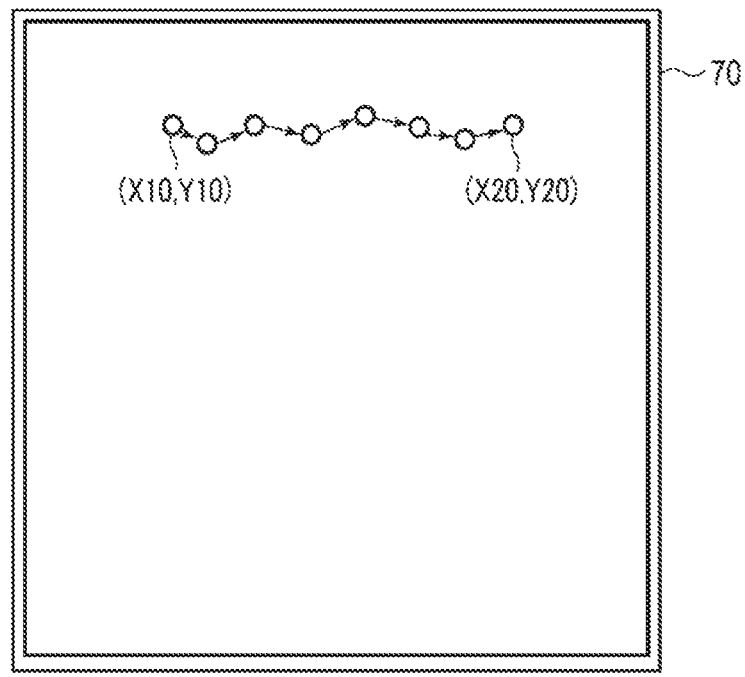
FIG. 9 is an example of a trajectory display screen.

FIG. 9 is an example of the trajectory display screen 70. In the example of FIG. 9, the trajectory of the positioning target 50 from the coordinates (X10, Y10) which becomes the first base point at time T1 ("10:10:10") to the coordinates (X20, Y20) which becomes the second base point at time T2 ("10:10:17") is depicted by points indicating the coordinates which become the midpoint of each time ("10:10:11" to "10:10:16") and arrows connecting the points. Although not specifically depicted in FIG. 9, a map of the positioning area 60 is also displayed on the trajectory display screen 70.

When processing of Act 31 is ended, as Act 32, the processor 31 sets the second flag F2 to "1". Thereafter, the processor 31 proceeds to Act 10. At this point in time, the second flag F2 is updated with "1". Accordingly, the processor 31 executes processing of Act 11 and Act 12.

That is, as Act 11, the processor 31 calculates a tentative position in the absolute coordinate system of the positioning target 50 from relative movement data aftertime T2 ("10: 10:17") at which the second base point is set. Specifically, the processor 31 acquires the total angle sum "80°" of the relative movement data and the moving amount "1.0 m" of the relative movement data stored in association with the time "10:10:18" from the third table 333. Further, the processor 31 obtains the direction relative to the absolute coordinates at time "10:10:17" by adding Δθ obtained by the equation (2) to the total angle sum "30°" stored in association with the time "10:10:17" in the third table 333. The processor 31 calculates the coordinates (X20+α1, Y20+β1) of a point, which is moved from the absolute coordinate (X20, Y20) stored in the fourth table 334 in association with the time "10:10:17" by the moving amount "1.0 m", in a direction [(Δθ+30)+50] obtained by adding a difference "50°" in the total angular sum between time "10:10:17" and time "10:10:18" to the direction (Δθ+30) with respect to the absolute coordinate at time "10:10:17", as the tentative position coordinates. The processor 31 records the tentative position coordinates (X20+α1, Y20+β1) in association with the time "10:10:18" of the fourth table. Next, the processor 31 acquires the total angle sum "90°" and the moving amount "1.2 m" of the relative movement data stored in association with the time "10:10:19" from the third table 333. The processor 31 calculates the coordinates (X20+α1, Y20+β1) of a point, which is moved from the tentative position coordinates (X20+α1, Y20+β1) stored in association with the time "10:10:18" in the fourth table 334 by the moving amount "1.0 m", in a direction [[Δθ+30)+50]+10] obtained by adding a difference "10°" in the total angular sum between the time "10:10:18" and time "10:10:19" to the direction [(Δθ+30)+50] with respect to the tentative position coordinate at time "10:10:18", as the tentative position coordinates. The processor 31 records the tentative position coordinates (X20+α2, Y 20+β2) in association with the time "10:10:19" of the fourth table. Thereafter, the processor repeats processing of obtaining the tentative position coordinates for each time in the same manner as described above until time "10:10:23" corresponding to the value of the second counter t is reached. Here, the processor 31 realizes a tentative unit by executing processing of Act 11.

As Act 12, the processor 31 adds a trajectory representing a tentative position of the positioning target to the trajectory display screen 70 based on the coordinates (X, Y) after time T2 ("10:10:17") stored in the fourth table 334.

Figure 10:
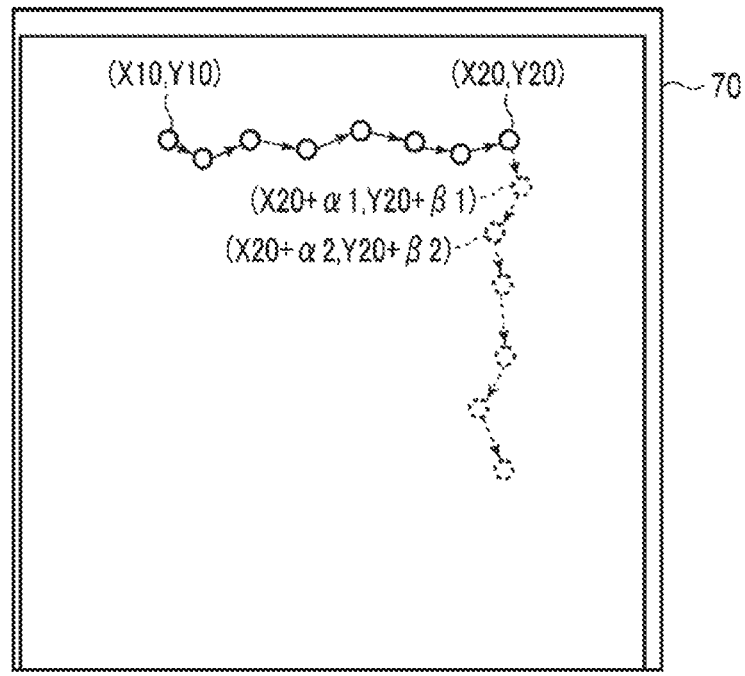
FIG. 10 is another example of a trajectory display screen.

FIG. 10 is an example of the trajectory display screen 70 to which the trajectory representing the tentative position is added. In the example of FIG. 10, the trajectory representing the tentative position of the positioning target is indicated by the dashed line.

When processing of Act 11 and Act 12 is ended, the processor 31 proceeds to Act 13 and counts up the second counter t by "1". Thereafter, in a case where the instruction to end positioning is not made, the processor 31 returns to Act 4 and executes processing in and after Act 4 again.

As a result, the processor 31 records "437" as the first ID, "−89" as the RSSI, "437:1.0" as the occupation ratio, "437" as the second ID, and "10" as the total angle sum, and "1.0" as the moving amount, respectively, in the third table 333 in association with the time "10:10:24". At this time, the second flag F2 is set to "1" and thus, processing of Act 11 and Act 12 is executed. That is, the processor 31 obtains the tentative position of the positioning target 50 at time "10:10:24" and adds the tentative position and the trajectory to the trajectory display screen 70.

Thereafter, the processor 31 repeats the same processing. Accordingly, in processing of Act 25, when the third time T3 ("10:10:22") for the base station 10C having the beacon ID "427" is specified, the processor 31 executes processing of Act 28 to Act 31. That is, the processor 31 records the absolute coordinates (X30, Y30) in association with the time T3 ("10:10:22") of the fourth table 334 so that the relative coordinates (PDRx, PDRy) of the positioning target 50 at the third time T3 is replaced with the absolute coordinates (X30, Y30) of the base station 10C.

Furthermore, the processor 31 calculates the scale magnification d and the rotational direction displacement Δθ for converting the relative coordinates into the absolute coordinates. The processor 31 converts the position of the positioning target 50 in each time ("10:10:18" to "10:10:21") within a time period between time T2 ("10:10:17") and time T3 ("10:10:22"), the relative coordinates (PDRx, PDRy) of the midpoints, into the absolute coordinates (X, Y) and corrects the tentative position coordinates stored in association with each time ("10:10:18" to "10:10:21") of the fourth table 334 to the absolute coordinates thereof.

In a case where the instruction to end positioning is input through the input device 34, the processor 31 determines that the determination result in Act 14 is "YES" and ends information processing.

As described above, in the positioning system 100, the positioning target 50 carries the mobile station 20 capable of receiving radio waves of the beacon signals transmitted from multiple base stations 10 spaced apart from each other. In the first table 331, the positioning server 30 stores strength data of radio waves, which are transmitted and received respectively between the mobile station 20 and each base station 10, in time series.

The positioning system 100 measures the position of the positioning target 50 by the PDR using the mobile station 20. The positioning server 30 stores data of the relative coordinate system, which is related to the movement of the positioning target 50, in the second table 332 in time series.

Furthermore, the positioning server 30 executes the following operations. That is, the positioning server 30 determines the time at which the positioning target 50 comes closest to each base station 10, based on time series strength data stored in the first table 331. Between a first neighboring time when the positioning target 50 becomes closest to a first base station 10 and a second neighboring time when the positioning target 50 becomes closest to a second base station 10, the positioning server 30 converts data of the relative coordinate system stored in the second table 332 into the absolute coordinate system set at the first base station 10.

Therefore, according the positioning system 100 including the positioning server 30, it is possible to determine the absolute position of the positioning target 50 from positional data of the positioning target 50 obtained based on the relative coordinate system. In this case, there is no need to perform a predetermined operation on the mobile station 20 when the positioning target comes close to the base station 10. That is, a manual operation by a user is not needed and thus, the positioning server 30 and the positioning system 100 are simpler and use thereof is not limited to manual systems. In addition, there is no need to reduce the distance that the radio waves travel from the base station 10 and thus, it is possible to perform positioning with high reliability.

The positioning server 30 obtains the ratio of the base station 10 for which strength data becomes the largest within a predetermined time. When the ratio exceeds a predetermined threshold value, the base station 10 is set as a determination target, and the timing when the strength data of radio becomes the largest is recorded. Accordingly, even when the signal strength of the radio wave transmitted from the base station 10 is temporarily high at an unexpected place distant from the base station 10, this received signal strength information can be discarded so that it is possible to detect a position of the base station 10 with high accuracy.

The positioning server 30 can calculate the tentative position in the absolute coordinate system of the positioning target 50 based on the relative coordinate system data stored in the second table 332 in association with the time later than the second time. The calculated tentative position is the latest position of the positioning target 50. Accordingly, a trajectory can be obtained by adding the tentative position to the absolute position of the positioning target 50 in the absolute coordinate system having the particular base station set as the base point when the positioning target 50 previously came closest to the particular base station 10.

The tentative position is corrected every time the positioning target comes closest to another one of the base stations 10. Accordingly, reliability of positioning is not impaired.

In the following, a modification of the example embodiment described above will be described.

In the example embodiment described above, the base station 10 transmits a beacon signal and the mobile station 20 receives a beacon signal. In the modification, the mobile station 20 transmits a beacon signal and the base station 10 receives a beacon signal. In this case, the base station 10 may transmit data relating to radio wave reception strength of the beacon signal to the positioning server 30 via the access point 41, or may transmit the data to the positioning server 30 via the access point 41 through the mobile station 20.

In the example embodiments described above, the evaluation target time for computing the occupation ratio is set to 5 seconds. However, the evaluation target time may be other lengths. Similarly, a threshold value for the occupation ratio is not limited to 80% and may be other values.

In the example embodiments described above, the trajectory indicating the movement of the positioning target 50 is displayed. However, the positioning system 100 may detect the absolute position of the positioning target 50 and not display a trajectory. In this case, processing steps of Act 12 of FIG. 7 and Act 31 of FIG. 8 are omitted.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A positioning device, comprising:
   a processor configured to:
      calculate a first neighboring time at which a mobile device becomes closest to a first base station in a plurality of base stations based on received signal strength data and a second neighboring time at which the mobile device becomes closest to a second base station in the plurality of base stations; and
      convert relative movement data into position coordinates data specifying an absolute position of the mobile device in an absolute coordinate system using the location of the first base station as a reference point from the first neighboring time to the second neighboring time, wherein
   the received signal strength data is in a time series according to time information from the mobile device and includes a received signal strength indicator according to a signal strength between the mobile device and each of the plurality of base stations, and
   the relative movement data is received from the mobile device in time series within a relative coordinate system.

2. The positioning device according to claim 1, wherein the processor is further configured to:
   compute an occupation ratio for each base station in the plurality of base stations for which the received signal strength data is received within a predetermined time, and
   determine the mobile device is closest to a particular base station in the plurality of base stations when the occupation ratio for that particular base station exceeds a predetermined threshold value.

3. The positioning device according to claim 1, wherein the processor is further configured to calculate a tentative position of the mobile device in the absolute coordinate system based on the relative movement data in association with each time subsequent to the second neighboring time.

4. The positioning device according to claim 3, wherein the processor is further configured to:

determine a third neighboring time at which the mobile device becomes closest to a third base station in the plurality of base stations; and
convert the relative movement data from the second neighboring time to the third neighboring time into position coordinates data specifying an absolute position of the mobile device in the absolute coordinate system, and replace the tentative position of the mobile device with the absolute position.

5. The positioning device according to claim 4, further comprising:
   a display screen configured to display a trajectory of the mobile device, the trajectory including a calculated absolute position of the mobile device and a calculated tentative position of the mobile device at times prior to the current time.

6. The positioning device according to claim 1, wherein the plurality of base stations are signal beacons transmitting radio waves to the mobile device, and the received signal strength indicator is set according to a strength of the radio waves received at the mobile device.

7. The positioning device according to claim 1, wherein the mobile device transmits radio waves to the plurality of base stations, and the received signal strength indicator is set according to a strength of the radio waves received at a base station.

8. A positioning system, comprising:
   a plurality of base stations distributed within a positioning area, each of the base stations being at a location with known coordinates within an absolute coordinate system;
   a mobile device configured to:
      transmit signals to the base stations and receive signals from the base stations; and
      estimate a moving direction and a moving velocity of the mobile device from sensor data to generate relative movement data; and
   a positioning server configured to:
      calculate a first neighboring time at which the mobile device becomes closest to a first base station in the plurality of base stations based on received signal strength data and a second neighboring time at which the mobile device becomes closest to a second base station in the plurality of base stations; and
      convert relative movement data from the mobile device into position coordinates data specifying an absolute position of the mobile device in an absolute coordinate system using the first base station as a reference point from the first neighboring time to the second neighboring time, wherein
   the received signal strength data is in a time series according to time information from the mobile device and includes a received signal strength indicator according to a signal strength between the mobile device and each of the plurality of base stations, and
   the relative movement data is received from the mobile device in time series within a relative coordinate system.

9. The positioning system according to claim 8, wherein the processor is further configured to:
   compute an occupation ratio for each base station in the plurality of base stations for which the received signal strength data is received within a predetermined time, and
   determine the mobile device is closest to a particular base station in the plurality of base stations when the occupation ratio for that particular base station exceeds a predetermined threshold value.

10. The positioning system according to claim 8, wherein the processor is further configured to calculate a tentative position of the mobile device in the absolute coordinate system based on the relative movement data for times subsequent to the second neighboring time.

11. The positioning system according to claim 10, wherein the processor is further configured to:
determine a third neighboring time at which the mobile device becomes closest to a third base station in the plurality of base stations; and
convert the relative movement data from the second neighboring time to the third neighboring time into position coordinates data specifying an absolute position of the mobile device in the absolute coordinate system, and replace the tentative position of the mobile device with the absolute position.

12. The positioning system according to claim 11, further comprising:
a display screen configured to display a trajectory of the mobile device, the trajectory including a calculated absolute position of the mobile device and a calculated tentative position of the mobile device at times prior to the current time.

13. The positioning system according to claim 8, wherein the plurality of base stations are signal beacons transmitting radio waves to the mobile device, and the received signal strength indicator is set according to a strength of the radio waves received at the mobile device.

14. The positioning system according to claim 8, wherein the mobile device transmits radio waves to the plurality of base stations, and the received signal strength indicator is set according to a strength of the radio waves received at a base station.

15. A positioning method, comprising:
calculating a first neighboring time at which a mobile device becomes closest to a first base station in a plurality of base stations based on received signal strength data and a second neighboring time at which the mobile device becomes closest to a second base station in the plurality of base stations; and
converting relative movement data into position coordinates data specifying an absolute position of the mobile device in an absolute coordinate system using the first base station as a reference point from the first neighboring time to the second neighboring time, wherein
the received signal strength data is in a time series according to time information from the mobile device and includes a received signal strength indicator according to a signal strength between the mobile device and each of the plurality of base stations, and
the relative movement data is received from the mobile device in time series within a relative coordinate system.

16. The positioning method according to claim 15, further comprising:
computing an occupation ratio for each base station in the plurality of base stations for which the received signal strength data is received within a predetermined time; and
determining the mobile device is closest to a particular base station in the plurality of base stations when the occupation ratio for that particular base station exceeds a predetermined threshold value.

17. The positioning method according to claim 15, further comprising:
calculating a tentative position of the mobile device in the absolute coordinate system based on the relative movement data in association with each time subsequent to the second neighboring time.

18. The positioning method according to claim 17, further comprising:
determining a third neighboring time at which the mobile device becomes closest to a third base station in the plurality of base stations; and
converting the relative movement data from the second neighboring time to the third neighboring time into position coordinates data specifying an absolute position of the mobile device in the absolute coordinate system, and replacing the tentative position of the mobile device with the absolute position.

19. The positioning method according to claim 18, further comprising:
displaying a trajectory of the mobile device, the trajectory including a calculated absolute position of the mobile device and a calculated tentative position of the mobile device at times prior to the current time.

20. The positioning method according to claim 15, wherein the plurality of base stations are signal beacons transmitting radio waves to the mobile device, and the received signal strength indicator is set according to a strength of the radio waves received at the mobile device.

* * * * *